United States Patent [19]

Furugohri et al.

[11] Patent Number: 5,225,136
[45] Date of Patent: Jul. 6, 1993

[54] INJECTION MOLDING METHOD FORMING STRENGTHENED WELD BY USING WELL

[75] Inventors: Yoshihiro Furugohri, Shimizu; Yukihisa Kumagai, Shizuoka, both of Japan

[73] Assignee: Polyplastics Co., Ltd., Osaka, Japan

[21] Appl. No.: 865,882

[22] Filed: Apr. 9, 1992

[30] Foreign Application Priority Data

Apr. 9, 1991 [JP] Japan ................................. 3-076337

[51] Int. Cl.5 .................................................. B29C 45/18
[52] U.S. Cl. ............................... 264/328.8; 264/328.12
[58] Field of Search ................ 264/328.12, 328.8, 108, 264/328.7; 425/560, 573

[56] References Cited

U.S. PATENT DOCUMENTS

| | | | |
|---|---|---|---|
| 3,880,978 | 4/1975 | Apostoleris et al. | 264/328.12 |
| 4,399,093 | 8/1983 | Kirby et al. | 264/328.12 |
| 4,420,452 | 12/1983 | van Dalen et al. | 264/328.12 |
| 4,925,161 | 5/1990 | Allan et al. | 264/328.8 |
| 4,994,220 | 2/1991 | Gutjahr et al. | 264/328.8 |
| 5,069,840 | 12/1991 | Arnott | 264/328.8 |

*Primary Examiner*—Jill L. Heitbrink
*Attorney, Agent, or Firm*—Depaoli & O'Brien

[57] ABSTRACT

In a method of injection-molding a thermoplastic resin wherein a weld is formed in the mold cavity by the fusion of separate resin streams, use is made of a mold provided with a resin well protruding from the molded cavity or a runner on at least one of the separate resin streams at a point between where the injected molten resin is separated into streams and the weld. The resin is poured into the resin well after the formation of the weld from the feed of the molten resin into the mold cavity to cause migration of the resin at the weld, thus forcing the resin on one side of the weld into the resin of the other side of the weld to thereby strengthen the weld.

9 Claims, 2 Drawing Sheets

INJECTION MOLDING METHOD FORMING STRENGTHENED WELD BY USING WELL

FIELD OF INVENTION

The present invention relates to an injection molding method, an injection mold, and an injection molded article formed of a thermoplastic resin. More particularly, the present invention is concerned with an injection molding method and an injection mold which can remarkably improve the appearance of a weld and the weld strength of a molded article. The invention is also directed to an injection molded article having an improved weld strength and formed by the injection molding method of the invention.

BACKGROUND OF THE INVENTION

In a conventional mold and injection molding process, a molten resin is injected into and fills a single mold cavity through a plurality of gates such that a plurality of resin streams are formed within the mold cavity. A weld forms at the position where the individual resin streams are united and fused. Even if a molten resin is filled into the mold cavity through a single gate, the resin may be separated into separate streams by a core or the like provided within the cavity such that again a weld forms at the position where the separated resin streams are united into a single stream. Further, if a molded article contains a portion having an uneven thickness, the molten resin injected and filled into the mold cavity is separated into separate streams due to the difference which occurs in the filing rate of the resin between the portion having a larger thickness and the portion having a smaller thickness, such that again a weld often forms at the portion where the separated resin streams are united into a single stream. In many cases, a weld in the molded article is formed due to a combination of the above-described factors. Accordingly, it is very difficult to produce a useful molded article having a complicated shape that is free from a weld. Unfortunately, the presence of a weld during molding poses very serious problems including not only the formation of a linear pattern called a weld mark which deteriorates the molded article appearance, but also the strength of the formed molded article is much lower than the inherent strength of the resin, because the molten resin streams at the weld are merely united and fused with each other and are not homogeneously mixed.

In order to solve the problem of low weld strength, Japanese Patent Laid-Open No. 71459/1973 discloses a molding process which comprises filling a resin into a mold which is provided with a resin well at a position where the weld occurs and pushing back the resin contained in the resin well into the mold, thereby improving the strength of the weld. Japanese Patent Laid-Open No. 202414/1990 discloses a molding process which comprises injecting and filling a resin into a mold cavity through a plurality of gates provided with a valve to form resin streams, uniting the resin streams and then operating the valve to give rise to a difference in the resin filling pressure to disturb the weld, thereby improving the strength of the weld.

In each of the above processes, however, it is difficult to disturb the orientation of a sufficient amount of resin or filler at the weld such that no satisfactory improvement in weld strength has been attained.

SUMMARY OF THE INVENTION

The present invention is directed to solving the above-described problems with respect to producing a molded article having an improved weld strength. More specifically, the invention is directed to a method of efficiently improving weld strength of a molded article and a novel mold to be used for this purpose wherein the resin is caused to migrate while the resin maintains fluidity in the mold cavity after the formation of the weld, and disturbing the orientation of the resin or filler at the weld.

Accordingly, the present invention provides an injection molding method for a thermoplastic resin, wherein use is made of a mold provided with a resin well protruding from the mold cavity or from a runner on at least one of the separated resin passages at a point between where the resin is divided into separated streams to the weld formed by the union of the separated resin streams, and wherein resin is poured into the resin well after the formation of the weld to cause migration of the resin at the weld and forcing the resin on one side of the weld into the resin on the other side of the weld to strengthen the weld. A molded article formed by the method of this invention has improved weld appearance and weld strength.

DETAILED DESCRIPTION OF THE INVENTION

The mold and molding method according to the present invention will now be described in more detail with reference to the attached drawings.

Figure 12:
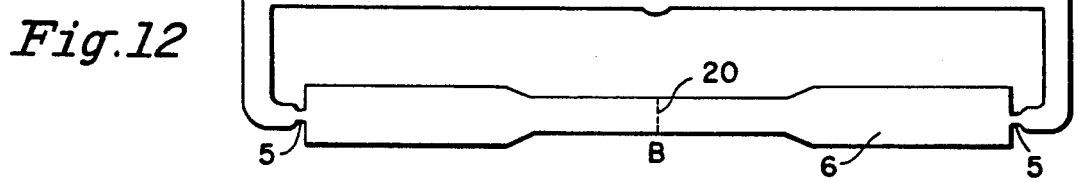
FIG. 12 is a plan view of a typical mold which gives rise to a weld.
Figure 13:
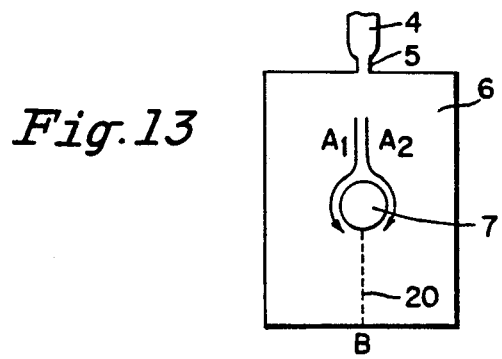
FIG. 13 is a plan view of another typical mold which gives rise to a weld.

In molding an article using a typical mold as shown in FIGS. 12 and 13, the injected molten filling resin is separated within runner 4 into resin streams $A_1$ and $A_2$ underneath a sprue 3 in the case of the mold shown in FIG. 12 and in front of a core 7 in the case of the mold shown in FIG. 13. The molten resin enters mold cavity 6 through one or more gates 5 depending on the point at which the molten resin is separated. A weld 20 is formed at point B in mold cavity 6 where the separated resin streams are united. In the above-described weld, the front ends of the two separated resin streams $A_1$ and $A_2$ come into contact with each other and apparently adhere to each other, and the resin or filler contained in the resin orients with the weld therebetween. Thus, the resin streams $A_1$ and $A_2$ are not in a homogeneously mixed state and, accordingly, the strength at the weld is unfavorably lowered. Further, a line called a weld line occurs, which deteriorates the appearance of the molded article.

Figure 1:
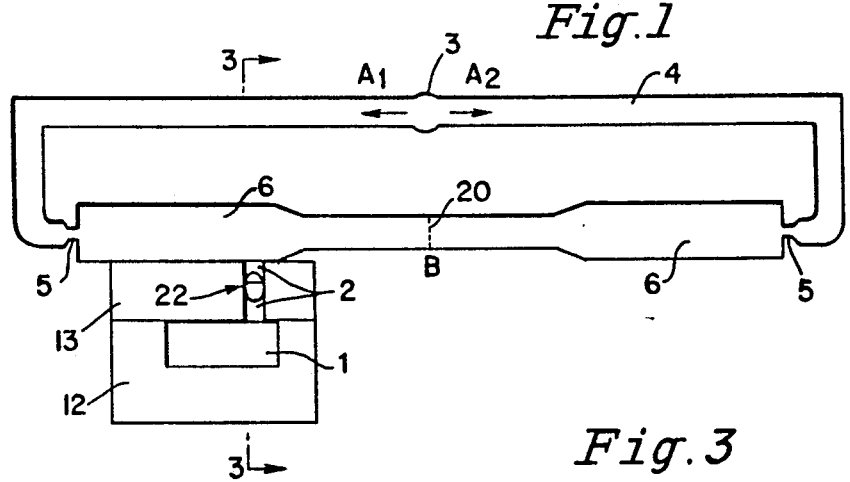
FIG. 1 is a plan view of one embodiment of the mold of the present invention wherein a resin well is provided on a typical mold which gives rise to a weld.
Figure 2:
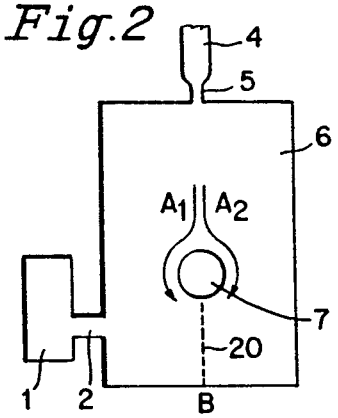
FIG. 2 is a plan view of an embodiment of the mold of the present invention wherein a resin well is provided on another typical mold which gives rise to a weld.

FIGS. 1 and 2 illustrate the improved molds of the present invention and which also give rise to the formation of a weld. It is to be understood that the shape of mold cavity 6 is intended to be generic. As shown in FIGS. 1 and 12, mold cavity 6 will form articles useful in mechanical testing under ASTM standards. In order to improve the weld strength of a molded article according to the present invention, a resin well 1 is provided at a predetermined position, that is, on at least one of the resin passages starting from the point where an injected molten filling resin is separated into streams $A_1$ and $A_2$ and terminating at the weld 20 formed by the union of the separated resin streams. It is a matter of course that most of the practical molds rarely have such a simple form as shown in FIGS. 1 and 2, and the manner of filling the molten resin into the mold cavity, the weld formation process, etc., are more complicated. Fundamentally, however, the constitution of the mold and the molding method may be as has been described above and will be described below.

In molding wherein use is made of the molds as shown in FIGS. 1 and 2 which are provided with a resin well 1 off of mold cavity 6, the injected molten filling resin is separated into resin streams $A_1$ and $A_2$, the molten resin fills mold cavity 6 and a weld 20 is formed at a point B where these streams are united in mold cavity 6 as in the case with typical mold structures. In accordance with this invention, molten resin further enters resin well 1 through resin well inlet 2 by use of a sufficient injection pressure applied to the resin or due to the dwelling time which gives rise to a pressure difference between the opposite sides of the weld 20. Resin on the side of the weld 20 not provided with resin well 1 is then forced into the resin on the side of the weld 20 provided with resin well 1 to disturb the orientation, etc., of the resin or filler at the weld and this contributes to an improvement in the strength of the weld and makes the weld line unnoticeable. Reference numeral 12 represents a block insert which contains and/or supports resin well 1 while reference numeral 13 is a block insert which contains and/or supports resin well inlet 2.

In the above-described molding method, before a weld is formed by the molten resin, part of the resin will often pour into resin well 1 depending upon the size of resin well inlet 2, the viscosity of the molding resin, etc. In such an instance, however, resin well 1 will not be completely filled with resin, and a space will be left in resin well 1 after the formation of the weld. Therefore, fundamentally, no problem occurs as far as maintaining the fluidity of the resin at weld 20. In this embodiment, weld 20 is initially formed at a position deviated from the point B towards resin well 1, and the migration of the resin still occurs at the weld. In order to minimize the amount of resin pouring into the resin well during the filling of the mold cavity with molten resin and to efficiently pour the resin into the resin well after the formation of the weld, it is generally preferred that the thickness of the inlet of the resin well be 0.2 to 0.7 times that of the thickness of the molded article at the inlet.

Although the above process is useful, when inlet 2 of resin well 1 is open and the resin pours into the resin well during the filling of the mold cavity, the efficiency of the resin well to provide mixing of the resin streams $A_1$ and $A_2$ at the weld is unavoidably lowered. Therefore, in order to allow the resin well 1 to function more efficiently without fail, it is preferred to provide a valve 22 at inlet 2 so that the pouring of the resin into resin well 1 can be forcibly controlled. The valve 22 to be provided at inlet 2 of resin well 1 is usually closed and may have such a structure that valve 22 spontaneously opens in response to the injection pressure or dwelling time after the molten resin fills cavity 6. Alternatively, valve 22 may have such a structure that the valve can be forcibly opened and closed by a separately provided drive mechanism 24. In this instance, a sensor S capable of detecting the state of filling of the resin into the mold cavity may be provided within the mold or on the side of the molding machine and the drive mechanism 24 may be provided to operate in response to the detected signal to open the valve. Alternatively, the time necessary for forming the weld may be previously measured so that the drive mechanism may operate after a predetermined period of time to open the valve.

Figure 3:
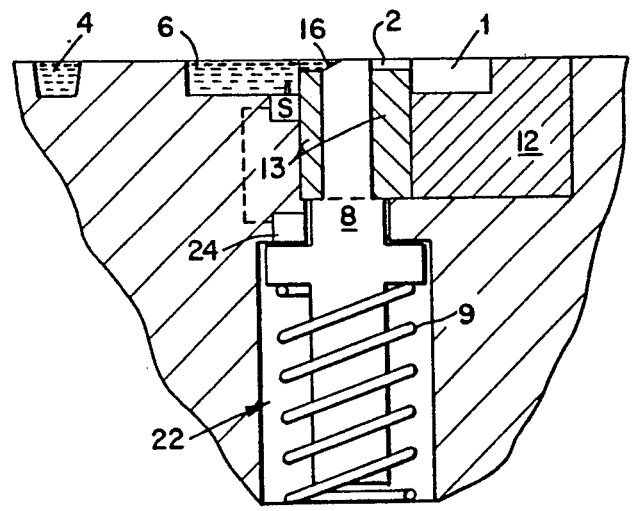
FIG. 3 is a cross-sectional view of the mold of this invention taken along line I—I of FIG. 1.
Figure 4:
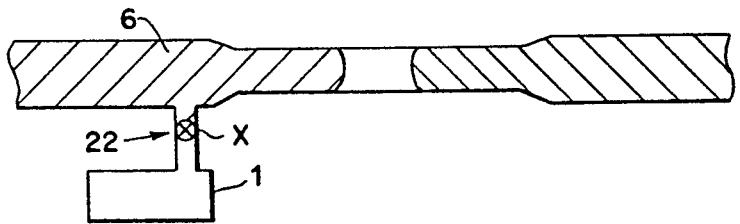
FIGS. 4–7 are plan diagrams of the principal portion of the mold of FIG. 1 illustrating the progression of resin as the mold cavity is filled, wherein X represents a closed state of a resin well inlet valve, and Y represents an opened state of the valve.
Figure 5:
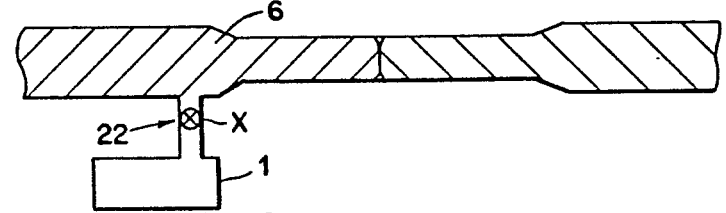

FIG. 3 is an embodiment in which the valve 22 spontaneously opens in response to the molten resin pressure applied to mold cavity 6. In this embodiment, a piston valve 8 having a diagonally cut top 16 is pushed into inlet 2 by the utilization of pressure formed such as by spring 9 or the like. The inlet 2 of the resin well 1 is closed during the filling of the resin into cavity 6. After cavity 6 is filled with the resin, pressure from the resin in cavity 6 is applied to diagonally cut portion 16 of piston valve 8 and a component force pushes piston valve 8 down. When this component force exceeds the pushing force of spring 9, valve 8 comes down, and provides an opening in inlet 2 which allows the resin to pour into resin well 1. The valve having the above-described structure is very simple and provides a useful mold structure to achieve the objective of improved weld strength.

In the above-described embodiment shown in FIG. 3 wherein the valve 8 opens in response to the pressure from the resin in mold cavity 6, it is preferred to set the spring pressure in such a manner that the valve opens when a pressure of 30 to 500 kg/cm$_2$ is applied thereto.

Figure 6:
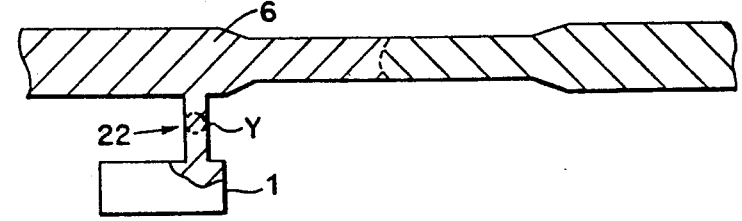
Figure 7:
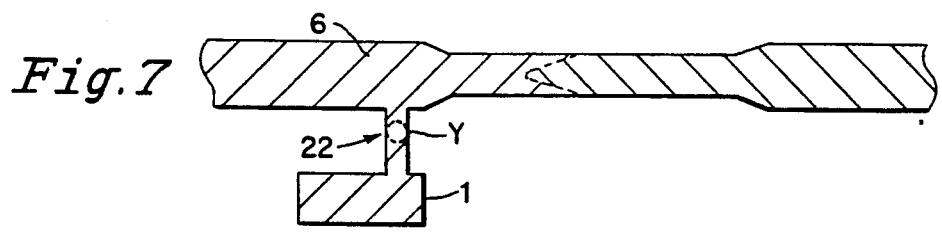
Figure 8:
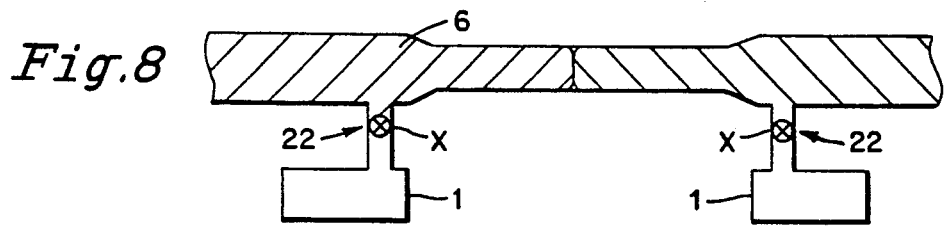
FIGS. 8–11 are plan diagrams of the principal part of an alternative mold within the scope of the present invention showing the progression of resin as the mold cavity is filled, wherein X represents a closed state of each resin well inlet valve, and Y represent an opened state of each valve.
Figure 9:
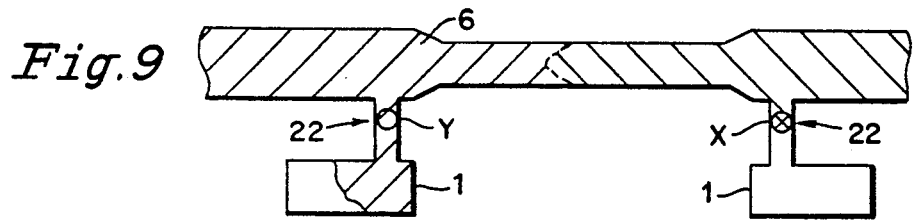
Figure 10:
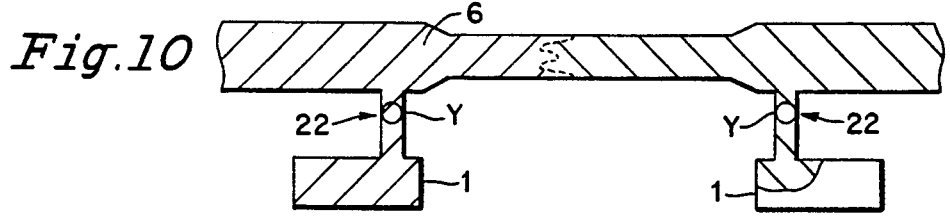
Figure 11:
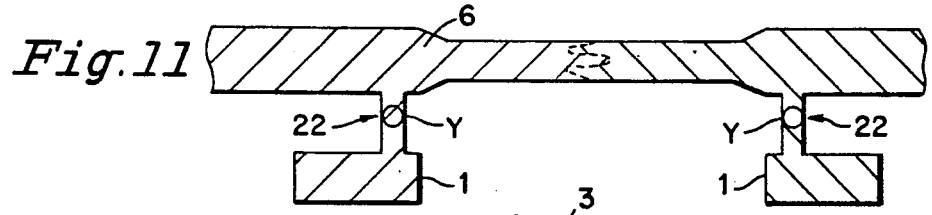

Alternatively, when the valve 22 is opened and closed by means of a drive mechanism 24, it is possible to open the valve immediately before the formation of a weld as well as after the formation of the weld. FIGS. 4 to 7 schematically show the state of filling a mold cavity with resin with the elapse of the time in the embodiment wherein molding is conducted by controlling the pouring of the resin into the resin well by use of a drive-operated valve. In this method, a valve 22 is provided and while the mold cavity is being filled, valve 22 is closed as designated by X in FIGS. 4 and 5. After molten resin has filled mold cavity 6 with valve 22 closed, valve 22 is then opened (designated by Y in FIGS. 6 and 7) such as by means of a drive mechanism 24 to allow the resin to pour into resin well 1. At this time, migration and forcing of the resin at weld 20 as shown in FIGS. 6 and 7 are efficiently conducted, which renders this method useful particularly for improving the weld strength and the appearance of the molded article.

In the mold according to the present invention, it is also possible to provide a plurality of resin wells. These wells can be provided on only one of the separated resin passages wherein the separated resin streams are united to form a weld, and a method wherein at least one well is provided on each of the separated resin passages. In particular, when use is made of a mold having a resin well provided by the latter method and molding is conducted by a method which comprises, forming a weld by filling the mold cavity with the molten resin, pouring the resin into a resin well provided on one side of the weld and subsequently pouring the resin into a resin well provided on the other side of the weld or a method wherein the resin is alternately poured into resin wells provided on both sides of the weld, the weld can be more efficiently disturbed by the alternate migration of the resin streams at the weld and the forcing of the resin, which renders this method very favorable for improving the weld strength and the appearance of the molded article. FIGS. 8 to 11 schematically show the state of filling of the mold and migration of the resin at the weld with the elapse of the time in this above-described molding procedure. In the mold used in this molding process, it is particularly useful to provide a valve 22 at the inlet of each resin well 1 so that alternate pouring of the resin into each resin well can be controlled.

In the mold of the present invention, the position and capacity of the resin well are related to the solidification speed of the resin, the volume between the resin separating point and the weld, and further the molding conditions such as resin temperature and injection pressure, and hence cannot be simply specified. However, it is important to provide, after consideration of these factors, a resin well having a suitable capacity at a position where the migration and forcing of the resin at the weld efficiently occur after the formation of the weld. Generally speaking, the capacity of the resin well is preferably $S \times 5$ (mm$^3$) or more, still preferably $S \times 10$ (mm$^3$) or more, wherein S represents the sectional area (mm$^2$) of the molded article along the weld.

Further, in the present invention, it is also possible to use the resin well as the cavity of another molded article.

Although the injection molding method and mold according to the present invention can be applied to the injection molding of any of known thermoplastic resin, the molding method and mold can be particularly usefully applied to the injection molding of a thermoplastic resin which has a remarkably lowered weld strength when molded by conventional molding methods. For example, when a thermoplastic resin containing an inorganic filler, particularly a fibrous filler, is molded by conventional methods, the strength of the molded article at the weld is much lower than at other portions of the article, since the inorganic filler, particularly a fibrous filler, orients along opposite sides of the weld. By contrast, the molding method and mold according to the present invention enable the strength of the weld to be sufficiently improved by virtue of efficient turbulence of the filler orientation at the weld. For example, in molding a thermoplastic resin containing a fibrous filler having a mean fiber length of 3 mm or more, a strong orientation of the fiber is observed along the weld, such that an unfavorably lowered weld strength occurs. The molding method and mold according to the present invention are particularly useful for molding such a resin composition. Also in molding a resin composition mainly composed of a crystalline thermoplastic resin, a similar problem is liable to occur due to the orientation of the crystalline resin along the weld. The molding method and mold according to the present invention is also very useful for molding a resin composition of this type.

As is apparent from the foregoing description, relative to the injection molding of a thermoplastic resin by conventional methods which give rise to the formation of a weld and consequently poor weld strength, the injection molding method and mold according to the present invention wherein use is made of a mold provided with a resin well protruding from the mold cavity or a runner on at least one of separated resin passages between the point where the injected molten filling resin is divided into separate streams and the point at which the weld is formed by the union of the separated resin streams and wherein the resin is poured into the resin well after the formation of the weld by the continual feed of molten resin into the molded article cavity to cause migration of the resin at the weld and, thus, force the resin on one side of the weld into the resin on the other side of the weld, provide excellent results in not only efficiently strengthening the weld but also in improving the appearance of the molded article.

EXAMPLES

The present invention will now be described in more detail with reference to the following examples, although the present invention is not to be so construed as to be solely limited to these Examples.

EXAMPLES 1-3 AND COMPARATIVE EXAMPLES 1-3

Resin compositions in the form of pellets having a length of 12 mm, comprising a polypropylene resin (PP), a polyamide 66 resin (PA66) or a polyethylene terephthalate resin (PET) and 40% by weight of a long glass fiber (GF) were injection-molded by the use of an injection mold having a structure as shown in FIG. 1 and provided with a valve at the inlet of the resin well as shown in FIG. 3. In these resin compositions, the long glass fiber had substantially the same length as that of the pellet (mean fiber length: about 12 mm) and oriented in the direction parallel to the longitudinal direction of the pellet.

The construction of the main sections of the mold used herein and molding conditions were as follows.
Dimension around weld of molded article:
20 mm in width × 4 mm in thickness
Resin well:
dimension = 40 mm × 15 mm × 15 mm in thickness
configuration of inlet = 7 mm in width × 4 mm in thickness
Valve:
regulated so that it opened in response to a pressure of 300 kg/cm$^2$ from the cavity
Molding conditions:
injection pressure = 1400 kg/cm$^2$
dwelling pressure = 440 kg/cm$^2$ For comparison, a molded article was prepared in the same manner as that described above, except that the molding was conducted with the inlet of the resin well of the mold shown in FIG. 1 being closed.

These molded articles were subjected to the measurement of tensile strength and elongation. Further, the appearance of the weld of the molded article (whether or not the weld line was present) was observed with the naked eye. The results are given in Table 1.

TABLE 1

|  | Ex. 1 | Comp. Ex. 1 | Ex. 2 | Comp. Ex. 2 | Ex. 3 | Comp. Ex. 3 |
| --- | --- | --- | --- | --- | --- | --- |
| construction of mold | resin well provided | no resin well provided | resin well provided | no resin well provided | resin well provided | no resin well provided |
| resin compsn. | PP/GF 40 wt. % | PP/GF 40 wt. % | PA66/GF 40 wt. % | PA66/GF 40 wt. % | PET/GF 40 wt. % | PET/GF 40 wt. % |
| tensile strength (kg/cm$^2$) | 658 | 221 | 1533 | 715 | 1017 | 623 |
| tensile elongation (%) | 0.97 | 0.35 | 1.36 | 0.73 | 1.02 | 0.43 |
| appearance of weld (weld line) | substantially unnoticeable | noticeable | substantially unnoticeable | noticeable | substantially unnoticeable | noticeable |

What is claimed is:

1. An injection molding method for a thermoplastic resin comprising, dividing an injected molten resin into at least two separate streams, filling a mold cavity with said resin from each of said streams whereby a weld is formed in said mold cavity at the point where said streams contact each other, providing a resin well protruding from said mold cavity or on a runner containing at least one of said separated resin streams at a point between where the injected molten resin is divided into said separate streams and said weld, and pouring said molten resin into said resin well after the formation of said weld to cause the migration of the resin at said weld so as to force the resin on one side of said weld into the resin on the opposite side of the said weld thereby strengthening the weld.

2. The method according to claim 1, wherein said resin well is provided with a valve at the inlet thereof, feeding the molten resin into the mold cavity with said valve closed and opening the valve to pour the resin into the resin well after formation of said weld.

3. The method according to claim 2, wherein said valve is opened in response to a pressure applied from the molten resin in said mold cavity after said cavity is filled so as to pour the resin into the resin well.

4. The method according to claim 3, wherein said valve is opened in response to a pressure of 30 to 500 kg/cm$^2$ applied from the molten resin in said cavity.

5. The method according to claim 2, wherein said valve is one which can be forcibly opened and closed by a separately provided drive mechanism, the molten resin being filled into said mold cavity with said valve closed, the amount of molten resin contained in said mold cavity being detected by means of a sensor, and the drive mechanism being actuated in response to the detected signal to open the valve, thus causing the resin to pour into the resin well.

6. The method according to claim 1, wherein said thermoplastic resin contains an inorganic filler.

7. The method according to claim 6, wherein said inorganic filler is a fibrous filler.

8. The method according to claim 7, wherein said fibrous filler is one with a mean fiber length of at least 3 mm.

9. The injection molding method according to claim 1, wherein the thermoplastic resin is a crystalline thermoplastic resin.

* * * * *